(12) United States Patent
Verhoeven et al.

(10) Patent No.: US 12,403,702 B2
(45) Date of Patent: Sep. 2, 2025

(54) METHOD AND PRINTER FOR PRINTING AND CURING AN IMAGE

(71) Applicant: Canon Production Printing Holding B.V., Venlo (NL)

(72) Inventors: Erik P.J. Verhoeven, Venlo (NL); Adrianus A. Draad, Venlo (NL); Maikel A.J. Huygens, Venlo (NL)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 213 days.

(21) Appl. No.: 18/143,868

(22) Filed: May 5, 2023

(65) Prior Publication Data

US 2023/0364929 A1 Nov. 16, 2023

(30) Foreign Application Priority Data

May 16, 2022 (EP) ..................................... 22173405

(51) Int. Cl.
*B41J 11/00* (2006.01)
(52) U.S. Cl.
CPC ............................. *B41J 11/00212* (2021.01)
(58) Field of Classification Search
CPC ............ B41J 11/00212; B41J 11/00218; B41J 11/00214; B41M 7/0081; C09D 11/101
See application file for complete search history.

(56) References Cited

U.S. PATENT DOCUMENTS

| | | | |
|---|---|---|---|
| 2005/0190248 A1* | 9/2005 | Konno | B41J 11/0015 347/42 |
| 2013/0084120 A1 | 4/2013 | Hopkins et al. | |
| 2014/0368589 A1* | 12/2014 | Perez Gellida | B41J 29/38 34/523 |
| 2018/0208789 A1* | 7/2018 | Takaku | B41M 5/0023 |
| 2018/0222215 A1 | 8/2018 | Schutten | |
| 2019/0152247 A1* | 5/2019 | Shinohara | D06P 1/673 |
| 2022/0001674 A1 | 1/2022 | Hokazono | |

FOREIGN PATENT DOCUMENTS

EP 2 726 297 B1 5/2017

OTHER PUBLICATIONS

European Search Report, issued in Priority Application No. 22173405.6, dated Oct. 21, 2022.

* cited by examiner

*Primary Examiner* — Bradley W Thies
(74) *Attorney, Agent, or Firm* — Birch, Stewart, Kolasch & Birch, LLP (57) ABSTRACT

A method for printing and curing an image uses a printer having a curing unit including at least one controllable radiation emitting unit. The printer includes a medium support configured to, in operation, support the recording medium. The method includes applying a predetermined pattern of a radiation-curable ink composition onto a recording medium to form an image; curing the image in a curing zone, wherein in the curing zone the recording medium covers a first area of the medium support, the medium support further having a second area not covered by the recording medium; controlling the curing unit to be in a curing mode in the first area of the medium; and controlling the curing unit to be in a non-curing mode in the second area of the medium support. A printer and a software product are also disclosed.

10 Claims, 5 Drawing Sheets

METHOD AND PRINTER FOR PRINTING AND CURING AN IMAGE

The present invention relates to a method for printing and curing an image. The present invention further relates to a printer for printing and curing an image. The present invention also relates to a software product.

BACKGROUND OF THE INVENTION

Methods for printing images using radiation-curable ink are well known in the art. In such methods, an image is formed by applying droplets of a radiation-curable ink onto a recording medium and curing the ink. Curing of such inks is typically done by irradiation the ink ejected onto the recording medium with a suitable type of radiation. UV radiation is most often used as radiation. Robust images may be formed using such methods. Many types of recording medium may be used, including paper, textile media, self-adhesive vinyl media and rigid media.

Several types of curing units are known, including scanning curing units and page-wide curing units. Scanning curing units are curing units that move in reciprocation in a main scanning direction. Scanning curing units typically have a dimension smaller than the maximum dimension of the recording medium the printer can handle and have to move along the scanning direction to cure the entire printed image. Page-wide curing units, on the other hand, have a width that at least matches the maximum width of a recording medium that can be handled by the printer. The page-wide curing array may not move in the scanning direction.

The size of recording medium used for printing in the printer may vary. There may be a maximum size of a recording medium that can be handled by the printer. However, the printer may—depending on the print job—prepare images on a recording medium having a size smaller than the maximum size. In that case, the page-wide curing unit may have a width larger than the size of the recording medium. The scanning width of a scanning curing unit may be larger than the maximum width of a recording medium that can be handled by the printer.

The curing unit of a printer is configured to emit radiation. This radiation is used to induce a polymerization reaction in ink applied onto a recording medium, thereby curing the ink. However, in case no ink is locally present, the radiation may still provide energy to the area exposed to radiation. Any object present in the exposed area, such as a non-printed portion of a recording medium or an area of a medium support, may be exposed to radiation and may be heated. Depending on the object present in the exposed area, heating of the object may negatively influence the properties of the object. Examples of negative influence include, but are not limited to, damage to the object and irregular thermal expansion.

It is therefore an object of the invention to provide a method for printing that prevents damage to parts of the printing system and/or parts of the recording medium.

The object of the invention is achieved in a method for printing and curing an image using a printer having a curing unit, the curing unit comprising at least one controllable radiation emitting unit, the printer further comprising a medium support configured to in operation support the recording medium, the method comprising the steps of:
  a) Applying a predetermined pattern of a radiation-curable ink composition onto a recording medium to form an image;
  b) Curing the image in a curing zone, wherein in the curing zone the recording medium covers a first area of the medium support, the medium support further having a second area not covered by the recording medium;
  c) Controlling the curing unit to be in a curing mode in the first area of the medium;
  d) Controlling the curing unit to be in a non-curing mode in the second area of the medium support.

The method may be performed using a printer. The printer may be configured to in printing operation apply a marking material. The marking material may be an ink, preferably a radiation-curable ink jet ink, such as a UV-curable inkjet ink. Suitable types of radiation-curable inkjet inks including UV-curable inkjet inks are known in the art. Preferably, the printer may be an inkjet printer, configured to apply ink onto the recording medium by jetting droplets of ink onto the recording medium in a predetermined pattern to form an image. The ink may be jetted onto the recording medium using an inkjet print head. The print head may be for example a thermal inkjet print head or a piezo electric inkjet print head. The printer may comprise a plurality of inkjet print heads. One type or color of ink may be used to form the image, but alternatively more than one type and/or color of ink may be used. A Cyan, a Magenta, a Yellow and a black ink may be used to form the image. In addition, one or more of a white ink, brown ink, grey ink, light magenta, light cyan, red, green, orange, purple ink may be used. Further, one or more of a primer composition, an overcoat composition and a metallic ink may be used.

In step a), a predetermined pattern of radiation-curable ink composition onto a recording medium to form an image. The pattern of ink may be applied onto the recording medium by applying a plurality of droplets onto the recording medium. The droplets may be applied using a suitable ink applicator, such as an inkjet print head.

In step b) the image is cured in a curing zone, wherein in the curing zone the recording medium covers a first area of the medium support, the medium support further having a second area not covered by the recording medium. In step b) the image is cured. The image may be cured by irradiation the ink deposited onto the recording medium with a suitable type of radiation, such as UV-radiation. The image is cured in a curing zone. The curing zone is a region on the medium support, which is irradiated with radiation emitted by the page wide curing array. The curing zone may be located in the same position as a printing zone. The printing zone is a region on the medium support, in which the recording medium receives the radiation-curable ink composition. Alternatively, the curing zone may be located downstream in the medium transport direction from the printing zone. The curing zone may be static with respect to the printing zone or alternatively, the curing zone may move with respect to the curing zone. The recording medium may be supported by the medium support. The medium support may have a surface configured to in operation support a recording medium. The recording medium may be supported during printing and curing. The surface of the medium support may have a first area. This first area may be covered by the recording medium. The medium support may further have a second area not covered by the recording medium.

In step c), the curing unit is controlled to be in a curing mode in the first area of the medium. In a curing mode, at least one radiation emitting unit of the curing unit emits radiation. The radiation may have a certain intensity. The intensity may be controlled such that the radiation-curable ink deposited on the recording medium may be effectively cured. The intensity may depend amongst others on the amount of ink deposited on the recording medium, the characteristics of the radiation-curable ink, the wavelength distribution of the radiation, the size of the area onto which radiation is emitted and the relative speed of the curing unit and the recording medium. The skilled person may select the intensity based on the properties of the curing unit, the radiation-curable ink and the printer. The first area of the recording medium covered by the recording medium may receive radiation that effectively cures the ink.

In step d), the radiation emitting elements, configured to in operation emit radiation onto the second area of the medium support, are controlled to be in a non-operating mode. In the non-operating mode, the intensity of the radiation emitted onto the support medium may be zero. Alternatively, the intensity of the radiation emitted onto the support medium may be non-zero, but may be at a level sufficiently low that no polymerization reaction is triggered by the radiation. The at least one radiation emitting units within the curing unit may be switched off. Alternatively, the units may emit radiation while a radiation shield or shutter may prevent the radiation from reaching the medium support.

In step c may be performed simultaneously with step b. Step c may also be performed simultaneously with step d. Preferably, step b, c and d are performed simultaneously.

In an embodiment, the curing unit is a page-wide curing array, the page-wide curing array comprising a number of individually controllable radiation emitting units being arranged along a direction perpendicular to a direction of medium transport, wherein in step c, the radiation emitting units, configured to in operation emit radiation onto the first area of the medium support, are controlled to be in a curing mode and wherein in step d, the radiation emitting units, configured to in operation emit radiation onto the second area of the medium support, are controlled to be in a non-curing mode.

The page-wide curing array comprises a number of individually controllable radiation emitting elements. The radiation emitting elements may be single radiation emitting units, such as lamps or LEDs. Alternatively, the radiation emitting units may comprise a plurality of lamps or LEDs or a combination thereof. Non-limiting examples of lamps are UV arc lamps, mercury vapor lamps and metal halide bulbs. Preferably, the radiation emitting elements comprise at least one LED. The radiation emitting elements are arranged along a direction perpendicular to a direction of medium transport. The page-wide array may extend in a direction perpendicular to the medium transport direction. The length of the page-wide curing array in the direction perpendicular to the medium transport direction may be selected such that the entire width of a recording medium can be irradiated with radiation emitted by the page-wide array. For example, the length of the page-wide curing array in the direction perpendicular to the medium transport direction may be about the same as the maximum width of a recording medium that can be supported by the medium support.

The radiation emitting elements may be individually controllable. The radiation emitting elements may be controlled e.g. by controlling the amount of power supplied to the individual radiation emitting elements. By controlling the radiation emitting element, the radiation emitted by the element may be controlled. Various aspects of the radiation may be controlled, such as wavelength, intensity and optical profile of the radiation. Preferably, controlling the elements includes at least controlling the intensity of the radiation emitted by the elements. The intensity emitted by the single elements may be controlled individually and for each element, the radiation may be individually controlled to vary between a maximum intensity and 0. Optionally, also intensity in between the maximum intensity and 0 may be emitted. Optionally, the maximum intensity may vary for the various radiation emitting elements.

The individual radiation emitting elements may be configured to irradiate a certain area in the curing zone. The individual radiation emitting elements configured to in operation irradiate the first area of the medium support may be controlled to be in an operating mode. In the operating mode, the individual radiation emitting elements may emit radiation having a non-zero intensity. Hence, in printing operation, the first area of the medium support may be irradiated with radiation emitted by the individual radiation emitting elements, thereby irradiating the recording medium.

The individual radiation emitting elements configured to in operation irradiate the first area of the medium support may be controlled to emit a non-zero irradiation. The intensity of the radiation emitted may be the same for all the individual radiation emitting elements controlled to emit a non-zero irradiation or alternatively, the intensity may vary between the individual radiation emitting elements.

In an embodiment, the curing unit is a scanning curing unit configured to in operation move in reciprocation in a scanning direction in an area covering both the first area of the recording medium and the second area of the recording medium.

The curing unit may move in reciprocation in the scanning direction in the curing zone. When moving in the curing zone, the curing unit may move over the first area of the medium support as well as over the first area. When the curing unit is in a position, wherein the radiation-emitting elements-when in curing mode-irradiate the first area, then the at least one radiation-emitting element may be controlled to be in the curing mode. In curing mode, the at least one radiation-emitting element may emit radiation that induces a polymerization reaction in the radiation-curable ink deposited on the recording medium. When the curing unit is in a position, wherein the radiation-emitting elements-when in curing mode-irradiate the second area, then the at least one radiation-emitting element may be controlled to be in the non-curing mode. In the non-curing mode, the at least one radiation-emitting element may not emit radiation or may emit radiation not suitable to induce a polymerization reaction.

When the curing unit is a scanning curing unit, the at least one radiation-emitting element may be controlled to switch from the curing mode to the non-curing mode during the scanning movement. Switching from the curing mode to the non-curing mode may be done for example, but not limited to: switching off the at least one radiation-emitting element, switching the radiation of the at least one radiation-emitting element to a lower intensity or to a different wavelength, less suitable for inducing a polymerization reaction in the radiation-curable ink, covering the radiation emitted using a shutter, directing the radiation emitted away from the second area using a mirror, optical fiber or rotating the curing unit to prevent the radiation emitted to reach the second area.

In an embodiment, the method further comprises the step of:

a') moving the recording medium and the curing unit with respect to one another in a medium transport direction.

The recording medium and the curing unit may be moved with respect to one another in the medium transport direction. The recording medium may locally be provided with radiation-curable ink. The ink may be cured.

Curing may start when the relative movement has been performed. Alternatively or additionally, curing may take place during the relative movement of the recording medium and the curing unit. By moving the recording medium and the curing unit relative to one another in the medium transport direction, the curing zone may be not be the same as the printing zone. Consequently, an area of the recording medium to which ink is being applied may not simultaneously be provided with irradiation. This may reduce the risk of unwanted curing at the print head surface, that may result in future ejection failure. Further, the ink deposited onto the recording medium may have more time to spread over the recording medium, which may result in more glossy images.

In an embodiment, the recording medium is a rigid medium. Rigid media are media that may not be suitable to be rolled and may therefore not be supplied via a media supply roll. Examples of rigid media are rigid plates, such as rigid plates formed of plastic, for example polycarbonate, wood, glass or metal. Further examples of rigid media are corrugated media, such as corrugated cardboard.

The object of the invention is also achieved in a method for printing and curing an image using a printer having a curing unit, the curing unit comprising at least one controllable radiation emitting unit, the printer further comprising a medium support configured to in operation support the recording medium, the method comprising the steps of:
  a) determining the thermal conductivity of the recording medium;
  b) Applying a predetermined pattern of a radiation-curable ink composition onto a recording medium to form an image;
  c) Curing the image in a curing zone, wherein in the curing zone the recording medium covers a first area of the medium support, the medium support further having a second area not covered by the recording medium;
  d) Controlling the radiation-emitting elements, wherein step d further comprises:
    i. if the thermal conductivity of the recording medium is high, controlling the curing unit to be in a curing mode;
    ii. if the thermal conductivity of the recording medium is low. then controlling the curing unit to be in a curing mode in the first area of the medium support and controlling the curing unit to be in a non-curing mode in the second area of the medium support.

The method may be performed using a printer. The printer may be configured to in printing operation apply a marking material. The marking material may be an ink, preferably a radiation-curable ink jet ink, such as a UV-curable inkjet ink. Suitable types of radiation-curable inkjet inks including UV-curable inkjet inks are known in the art. Preferably, the printer may be an inkjet printer, configured to apply ink onto the recording medium by jetting droplets of ink onto the recording medium in a predetermined pattern to form an image. The ink may be jetted onto the recording medium using an inkjet print head. The print head may be for example a thermal inkjet print head or a piezo electric inkjet print head. The printer may comprise a plurality of inkjet print heads. One type or color of ink may be used to form the image, but alternatively more than one type and/or color of ink may be used. A Cyan, a Magenta, a Yellow and a black ink may be used to form the image. In addition, one or more of a white ink, brown ink, grey ink, light magenta, light cyan, red, green, orange, purple ink may be used. Further, one or more of a primer composition, an overcoat composition and a metallic ink may be used.

In step a, the thermal conductivity is determined. The thermal conductivity may be determined in several ways. For example, the thermal conductivity of a recording medium may be available from a look-up table. Alternatively, the thermal conductivity may be measured. The measurement may be performed by the printer or may be performed by an operator who inputs the measured value in the printer. Alternatively, a the thermal conductivity may be correlated to the type of medium used. Relatively thin media suitable to be handled in a roll-to-roll system may be allocated a high thermal conductivity in the system. In general, these types of medium have a relatively high thermal conductivity. Rigid media, on the other hand tend to have a relatively low thermal conductivity. Rigid media may be allocated a low thermal conductivity in the system.

The thermal conductivity determined is used to determine how the curing unit is controlled in curing operation.

In step b), a predetermined pattern of radiation-curable ink composition onto a recording medium to form an image. The pattern of ink may be applied onto the recording medium by applying a plurality of droplets onto the recording medium. The droplets may be applied using a suitable ink applicator, such as an inkjet print head.

In step c) the image is cured in a curing zone, wherein in the curing zone the recording medium covers a first area of the medium support, the medium support further having a second area not covered by the recording medium. In step b) the image is cured. The image may be cured by irradiation the ink deposited onto the recording medium with a suitable type of radiation, such as UV-radiation. The image is cured in a curing zone. The curing zone is a region on the medium support, which is irradiated with radiation emitted by the page wide curing array. The curing zone may be located in the same position as a printing zone. The printing zone is a region on the medium support, in which the recording medium receives the radiation-curable ink composition. Alternatively, the curing zone may be located downstream in the medium transport direction from the printing zone. The curing zone may be static with respect to the printing zone or alternatively, the curing zone may move with respect to the curing zone. The recording medium may be supported by the medium support. The medium support may have a surface configured to in operation support a recording medium. The recording medium may be supported during printing and curing. The surface of the medium support may have a first area. This first area may be covered by the recording medium. The medium support may further have a second area not covered by the recording medium.

In step d, radiation-emitting elements are controlled. The thermal conductivity of the recording medium, determined in step a) is taken into account in determining how the radiation-emitting elements operate. Thus, the radiation-emitting elements are controlled based on the thermal conductivity of the recording medium determined in step a. The at least one radiation emitting element may be individually controllable. The radiation emitting elements may be controlled e.g. by controlling the amount of power supplied to the individual radiation emitting elements. By controlling the radiation emitting element, the radiation emitted by the element may be controlled. Various aspects of the radiation may be controlled, such as wavelength, intensity and optical profile of the radiation. Preferably, controlling the at least one radiation-emitting element includes at least controlling the intensity of the radiation emitted by the at least one element. In case the curing unit comprises a plurality of individually controllable radiation-emitting elements, the intensity emitted by the single elements may be controlled individually and for each element, the radiation may be individually controlled to vary between a maximum intensity and zero. Optionally, also intensity in between the maximum intensity and zero may be emitted. Optionally, the maximum intensity may vary for the various radiation emitting elements.

The at least one radiation emitting element may be configured to irradiate a certain area in the curing zone. An individual radiation emitting element configured to in operation irradiate the first area of the medium support may be controlled to be in an curing mode. In the curing mode, the individual radiation emitting element may emit radiation having a non-zero intensity. Preferably, the intensity may be sufficiently high to induce a polymerization reaction in the radiation-curable ink.

If the thermal conductivity of the recording medium is high, the curing unit is controlled to be in a curing mode. If the curing unit comprises a plurality of radiation-emitting elements, all radiation emitting elements of the page-wide curing array may be controlled to be in a curing mode.

In this mode, the at least one radiation emitting element is controlled to emit radiation. The curing unit may emit radiation in the entire curing zone. In this mode, both the recording medium and the medium support are irradiated and receive radiation, which may not only result in curing of the ink deposited onto the recording medium, but also in heating of the recording medium and the support. The medium support may locally show thermal expansion in area where heat is received or generated. If the medium has high thermal conductivity, the medium support may thermally expand even if the medium support is locally covered by the recording medium. By irradiating both the areas of the recording medium support covered by the recording medium and the areas not covered by the recording medium, the thermal expansion may be the same for the entire medium support and unwanted artefacts caused by irregular thermal expansion may be prevented.

If the thermal conductivity of the recording medium is low, then the curing unit is controlled to be in a curing mode in the first area of the medium support and the curing unit is controlled to be in a non-curing mode in the second area of the medium support.

In this mode, only the recording medium is irradiated and receives radiation, whereas the medium support does not. The irradiation received by the recording medium may result in curing of the ink deposited onto the recording medium, as well as in heating of the recording medium. Since the thermal conductivity of the recording medium is low, the heat may not be transferred to the medium support which hence may show no or very little temperature increase due to heat transfer by the recording medium. The area of the medium support not covered by the recording medium does not receive radiation. Hence, when printing a medium having low thermal conductivity, the temperature of the medium support may not increase significantly and no unwanted side effects due to temperature increase may occur.

In an embodiment, the curing unit is a page-wide curing array, the page-wide curing array comprising a number of individually controllable radiation emitting units being arranged along a direction perpendicular to a direction of medium transport, wherein in step d-ii, the radiation emitting units, configured to in operation emit radiation onto the first area of the medium support, are controlled to be in a curing mode and wherein the radiation emitting units, configured to in operation emit radiation onto the second area of the medium support, are controlled to be in a non-curing mode.

The page-wide curing array comprises a number of individually controllable radiation emitting elements. The radiation emitting elements may be single radiation emitting units, such as lamps or LEDs. Alternatively, the radiation emitting units may comprise a plurality of lamps or LEDs or a combination thereof. Non-limiting examples of lamps are UV arc lamps, mercury vapor lamps and metal halide bulbs. Preferably, the radiation emitting elements comprise at least one LED. The radiation emitting elements are arranged along a direction perpendicular to a direction of medium transport. The page-wide array may extend in a direction perpendicular to the medium transport direction. The length of the page-wide curing array in the direction perpendicular to the medium transport direction may be selected such that the entire width of a recording medium can be irradiated with radiation emitted by the page-wide array. For example, the length of the page-wide curing array in the direction perpendicular to the medium transport direction may be about the same as the maximum width of a recording medium that can be supported by the medium support.

The radiation emitting elements may be individually controllable. The radiation emitting elements may be controlled e.g. by controlling the amount of power supplied to the individual radiation emitting elements. By controlling the radiation emitting element, the radiation emitted by the element may be controlled. Various aspects of the radiation may be controlled, such as wavelength, intensity and optical profile of the radiation. Preferably, controlling the elements includes at least controlling the intensity of the radiation emitted by the elements. The intensity emitted by the single elements may be controlled individually and for each element, the radiation may be individually controlled to vary between a maximum intensity and 0. Optionally, also intensity in between the maximum intensity and 0 may be emitted. Optionally, the maximum intensity may vary for the various radiation emitting elements.

The individual radiation emitting elements may be configured to irradiate a certain area in the curing zone. The individual radiation emitting elements configured to in operation irradiate the first area of the medium support may be controlled to be in an operating mode. In the operating mode, the individual radiation emitting elements may emit radiation having a non-zero intensity. Hence, in printing operation, the first area of the medium support may be irradiated with radiation emitted by the individual radiation emitting elements, thereby irradiating the recording medium.

The individual radiation emitting elements configured to in operation irradiate the first area of the medium support may be controlled to emit a non-zero irradiation. The intensity of the radiation emitted may be the same for all the individual radiation emitting elements controlled to emit a non-zero irradiation or alternatively, the intensity may vary between the individual radiation emitting elements.

In an embodiment, the curing unit is a scanning curing unit configured to in operation move in reciprocation in a scanning direction in an area covering both the first area of the recording medium and the second area of the recording medium.

The curing unit may move in reciprocation in the scanning direction in the curing zone. When moving in the curing zone, the curing unit may move over the first area of the medium support as well as over the first area. When the curing unit is in a position, wherein the radiation-emitting elements-when in curing mode-irradiate the first area, then the at least one radiation-emitting element may be controlled to be in the curing mode. In curing mode, the at least one radiation-emitting element may emit radiation that induces a polymerization reaction in the radiation-curable ink deposited on the recording medium. When the curing unit is in a position, wherein the radiation-emitting elements-when in curing mode-irradiate the second area, then the at least one radiation-emitting element may be controlled to be in the non-curing mode. In the non-curing mode, the at least one radiation-emitting element may not emit radiation or may emit radiation not suitable to induce a polymerization reaction.

When the curing unit is a scanning curing unit, the at least one radiation-emitting element may be controlled to switch from the curing mode to the non-curing mode during the scanning movement. Switching from the curing mode to the non-curing mode may be done by for example, but not limited to: switching off the at least one radiation-emitting element, switching the radiation of the at least one radiation-emitting element to a lower intensity or to a different wavelength, less suitable for inducing a polymerization reaction in the radiation-curable ink, covering the radiation emitted using a shutter, directing the radiation emitted away from the second area using a mirror, optical fiber or rotating the curing unit to prevent the radiation emitted to reach the second area.

Alternatively, when the thermal conductivity of the recording medium is high, the at least one radiation-emitting element may be in the curing mode during the scanning movement, without switching to the non-curing mode.

In an embodiment, the method further comprises:
b') Moving the recording medium relative to the curing unit in the direction of medium transport to the curing zone.

The recording medium and the curing unit may be moved with respect to one another in the medium transport direction. The recording medium may locally be provided with radiation-curable ink. The ink may be cured.

Curing may start when the relative movement has been performed. Alternatively or additionally, curing may take place during the relative movement of the recording medium and the curing unit. By moving the recording medium and the curing unit relative to one another in the medium transport direction, the curing zone may be not be the same as the printing zone. Consequently, an area of the recording medium to which ink is being applied may not simultaneously be provided with irradiation. This may reduce the risk of unwanted curing at the print head surface, that may result in future ejection failure. Further, the ink deposited onto the recording medium may have more time to spread over the recording medium, which may result in more glossy images.

In an embodiment, the individually controllable radiation emitting units are LED units comprising at least one LED element. The curing unit, such as the page-wide curing array may comprise a plurality of Light Emitting Diodes (LEDs). In an embodiment each one of the LEDs may be individually controllable. Alternatively, the LEDs of the curing unit may be grouped into a plurality of units, wherein each unit comprises a plurality of LEDs. Each unit may be individually controllable, but individual LEDs within a single unit may not be individually controllable.

In an aspect of the invention, a printing apparatus is provided, the printing apparatus comprising:
a. a curing unit, the curing unit comprising a at least one controllable radiation emitting unit;
b. Medium support to in operation support the recording medium;
c. radiation-curable ink applicator; and
d. controller configured to control the ink-jet printer to perform a method according to the present invention.

The printing apparatus may comprise a curing unit, the curing unit comprising a at least one controllable radiation emitting unit.

The printing apparatus may further comprise a medium support. The medium support may be configured to in operation support the recording medium. Optionally, the recording medium may be moved in a medium transport direction. The medium support may be a flat table. Optionally, the medium support may comprise an endless belt. The medium support may comprise holes for applying an underpressure. Applying an underpressure may fix the recording medium to the medium support.

Optionally, the printing apparatus may comprise medium transport unit. The medium transport unit may be configured to in operation move the recording medium relative to the printer in the medium transport direction.

The printing apparatus may further comprise a radiation-curable ink applicator. The applicator may be configured to apply a predetermined pattern of radiation-curable ink onto the recording medium to form an image. The radiation-curable ink applicator may for example be a roller or an inkjet print head. An inkjet printer comprises a plurality of nozzles for ejecting droplets of ink onto the recording medium. Preferably, the printing apparatus may comprise a plurality of ink applicators to apply several types of ink onto the recording medium. The several types of ink may comprise several colors of ink, such as one or more of the following colors: cyan, magenta, yellow, black, white, red, green, orange, purple, light cyan, light magenta, grey) or other types of ink such as primer, overcoat or metallic ink.

The printing apparatus may comprise a controller configured to control the ink-jet printer to perform a method according to the present invention. The printer apparatus is thus configured to perform the method according to the present invention.

In an embodiment, the curing unit is a page-wide curing array, the page-wide curing array comprising a number of individually controllable radiation emitting units being arranged along a direction perpendicular to a direction of medium transport. The page-wide array may comprise a support bar for carrying the radiation emitting elements. Optionally, the page-wide curing array may be moveable with respect to the medium support.

In an embodiment, the printing apparatus is a hybrid printing apparatus.

A hybrid printer is a printer that is capable of handling more than one type of media. For example, the hybrid printer may be capable of processing roll-based media as well as rigid media. The rigid printer may do so, because it has both flatbed printing function as well as roll-to-roll printing function. Hence, a hybrid printing apparatus is capable of handling a large variety of media.

In an embodiment, the radiation-curable ink applicator is positioned upstream, in the direction of medium transport, with respect to the curing unit, and wherein the distance between the radiation-curable ink applicator and the curing unit is such that the time interval between applying radiation-curable ink and curing the ink is at least 3 s. The radiation-curable ink applicator is positioned upstream, in the medium transport direction, with respect to the curing unit. This means that the recording medium first passes the radiation-curable ink applicator and afterwards, the recording medium passes the curing unit. Hence, the radiation-curable ink may be applied onto the recording medium before it is cured. The distance between the radiation-curable ink applicator and the curing unit may be such that the time interval between applying radiation-curable ink and curing the ink is at least 3 s. The time interval may be determined by the distance between the ink applicator and the curing unit, the speed of movement of the recording medium with respect to the curing unit, the angle of inclination of the radiation emitted by the curing unit with respect to the recording medium and the distance between the recording medium and the curing unit. The skilled person will know how to adjust these parameters to ensure the time interval between applying radiation-curable ink and curing the ink is at least 3 s.

By allowing at least three seconds between jetting and curing, the ink droplets applied onto the recording medium have time to spread over the recording medium, high gloss images may be obtained. Further, the print quality may be enhanced by allowing the droplets to spread.

In an embodiment, the radiation-curable ink is a radiation-curable gelling ink.

A radiation-curable gelling ink is an ink composition that is radiation-curable and that undergoes an increase in viscosity after being applied onto the recording medium. The increase in viscosity controls the spread of the droplet onto the recording medium. The droplets may spread over the recording medium to give a smooth ink layer that results in a high gloss image, but excessive spreading that may result in color bleeding may be prevented.

The viscosity increasing property may be provided by a gelling agent. A gelling agent is also referred to as gellant, rheology modifier or thickener. Suitable gelling agents are known in the art. Non-limiting examples of gellants used in gelling radiation-curable ink compositions are waxes, such as natural waxes and long chain carboxylic acids, and ketones.

In a further aspect of the invention, a software product is provided, the software product comprising program code on a non-transitory machine-readable medium, wherein the program code, when loaded into a controller of a printer with an applicator for applying a radiation-curable ink, a transport belt and a curing unit, causes the controller to perform a method according to the present invention.

BRIEF DESCRIPTION OF THE DRAWINGS

The present invention will become more fully understood from the detailed description given herein below and the accompanying drawings which are given by way of illustration only, and thus are not limitative of the present invention, and wherein.

In the drawings, same reference numerals refer to same elements.

DETAILED DESCRIPTION OF THE PREFERRED EMBODIMENTS

The present invention will now be described with reference to the accompanying drawings, wherein the same reference numerals have been used to identify the same or similar elements throughout the several views.

Printing System

Figure 1:
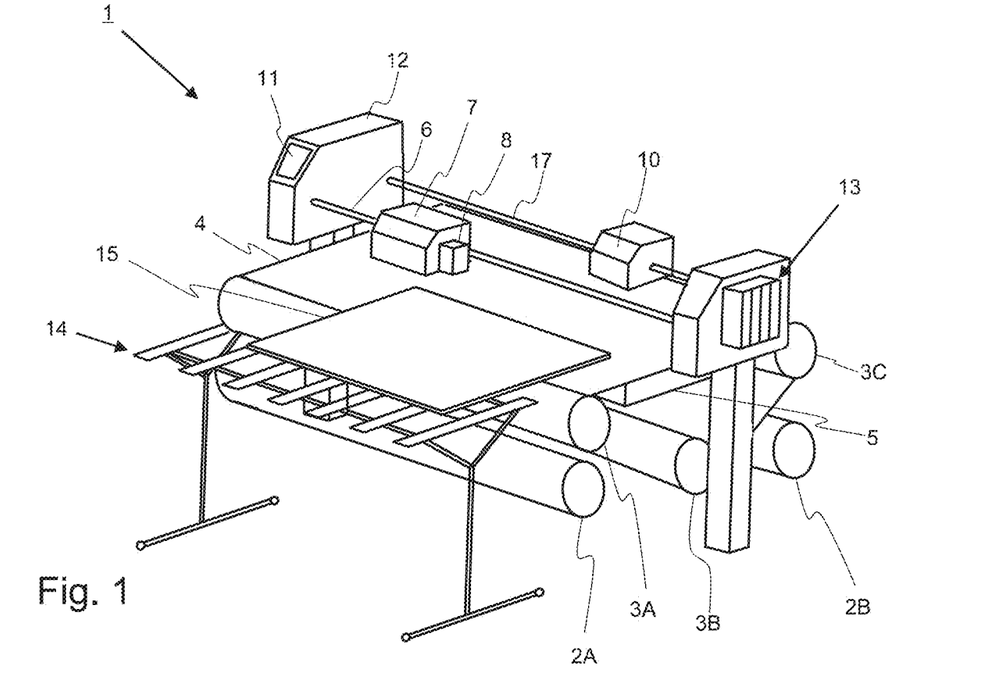
FIG. 1 is a schematic perspective view of a first example of a printing system according to the present invention in a first printing mode.

FIG. 1 shows a wide format inkjet printer 1. The printer 1 is a printing apparatus. The wide-format printer 1 comprises an inkjet printing assembly 7 for printing on a recording medium 15. The recording medium 15 in FIG. 1 is a relatively rigid substrate, such as a panel. The recording medium 15 is supplied from a media input unit 14, which may be configured for storing a plurality of such print media 15 and supplying these to the printer 1. The printer 1 comprises a medium support 4. Printer 1 may further comprise transport means for receiving and transporting the recording medium 15 along the inkjet printing assembly 7. In FIG. 1, the medium support is embodied as an endless belt 4.

The endless belt is an endless transport belt 4 supported on a plurality of support rollers 3A, 3B, 3C. At least one of the support rollers 3A, 3B, 3C is provided with driving means for moving the belt 4. The belt 4 is therefore configured to support and transport the recording medium. Additionally, one or more one of the support rollers 3A, 3B, 3C may be configured to be moved and/or tilted to adjust and control the lateral position of the belt 4. The inkjet printing assembly 7 may be provided with a sensor 8, such as a CCD camera, to determine the relative position of belt 4 and/or the recording medium 15. Data from said sensor 8 may be applied to control the position of the belt 4 and/or the recording medium 15. The belt 4 is further provided with through-holes and a suction box 5 in connection with a suction source (not shown), such that an underpressure may be applied to the recording medium 15 via the through-holes in the belt 4. The underpressure adheres the recording medium 15 flatly to the belt 4 and prevents displacement of the recording medium 15 with respect to the belt 4. Due to this holding the belt 4 is able to transport the recording medium 15. It will be appreciated that other suitable transport means, such as rollers, steppers, etc, may alternatively be applied. The recording medium 15 may be transported stepwise and/or in continuous movement. The inkjet printing assembly 7 is configured to translate along a first guide beam 6 in a scanning direction. The scanning direction is perpendicular to the direction in which the print medium is transported by the belt 4. The inkjet printing assembly 7 holds a plurality of print heads (not shown), which are configured to jet a plurality of different marking materials (different colors of ink, primers, coatings, etc.) on the recording medium 15. Each marking material for use in the printing assembly 7 is stored in one of a plurality of containers arranged in fluid connection with the respective print heads for supplying marking material to said print heads to print an image on the recording medium 15.

The ejection of the marking material from the print heads is performed in accordance with data provided in the respective print job. The timing by which the droplets of marking material are released from the print heads determines their position on the recording medium 15. The timing may be adjusted based on the position of the inkjet printing assembly 7 along the first guide beam 6. The above mentioned sensor 8 may therein be applied to determine the relative position and/or velocity of the inkjet printing assembly 7 with respect to the recording medium 15. Based upon data from the sensor 8, the release timing of the marking material may be adjusted.

Upon ejection of the marking material, some marking material may be spilled and stay on a nozzle surface of the print heads. The marking material present on the nozzle surface, may negatively influence the ejection of droplets and the placement of these droplets on the recording medium 15. Therefore, it may be advantageous to remove excess of marking material from the nozzle surface. The excess of marking material may be removed for example by wiping with a wiper and/or by application of a suitable anti-wetting property of the surface, e.g. provided by a coating.

The marking materials may require treatment to properly fixate them on the print medium. Thereto, a fixation unit 10 is provided downstream of the inkjet printing assembly 7. The fixation unit 10 may emit heat and/or radiation to facilitate the marking material fixation process. In the example of FIG. 1, the fixation unit 10 is a radiation emitter, which emits light of certain frequencies, which interacts with the marking materials, for example UV light in case of UV-curable inks. The fixation unit 10 in FIG. 1 is a scanning curing unit. The scanning curing unit comprises at least one radiation emitting unit (not shown). In operation, the curing unit 10 is moved in reciprocation in the scanning direction along guide rail 17. Further, the inkjet printing assembly 7 may be provided with a further fixation unit on the same carriage which holds the print heads. This further fixation unit can be used to (partially) cure and/or harden the marking materials, independent of or interaction with the fixation unit 10.

After printing and fixation, the recording medium 15 is transported to a receiving unit (not shown). The receiving unit may comprise a take-up roller for winding up the recording medium 15, a receiving tray for supporting sheets of recording medium 15, or a rigid media handler, similar to the media input unit 14. Optionally, the receiving unit may comprise processing means for processing the medium 8, 9 after printing, e.g. a post-treatment device such as a coater, a folder, a cutter, or a puncher.

The wide-format printer 1 furthermore comprises a user interface 11 for receiving print jobs and optionally for manipulating print jobs. The local user interface unit 11 is integrated to the print engine and may comprise a display unit and a control panel. Alternatively, the control panel may be integrated in the display unit, for example in the form of a touch-screen control panel. The local user interface unit 11 is connected to a control unit 12 connected to the printer 1. The control unit 12, for example a computer, comprises a processor adapted to issue commands to the printer 1, for example for controlling the print process. The printer 1 may optionally be connected to a network. The connection to the network can be via cable or wireless. The printer 1 may receive printing jobs via the network. Further, optionally, the control unit 12 of the printer 1 may be provided with an input port, such as a USB port, so printing jobs may be sent to the printer 1 via this input port.

Hybrid Printing System

Figure 2:
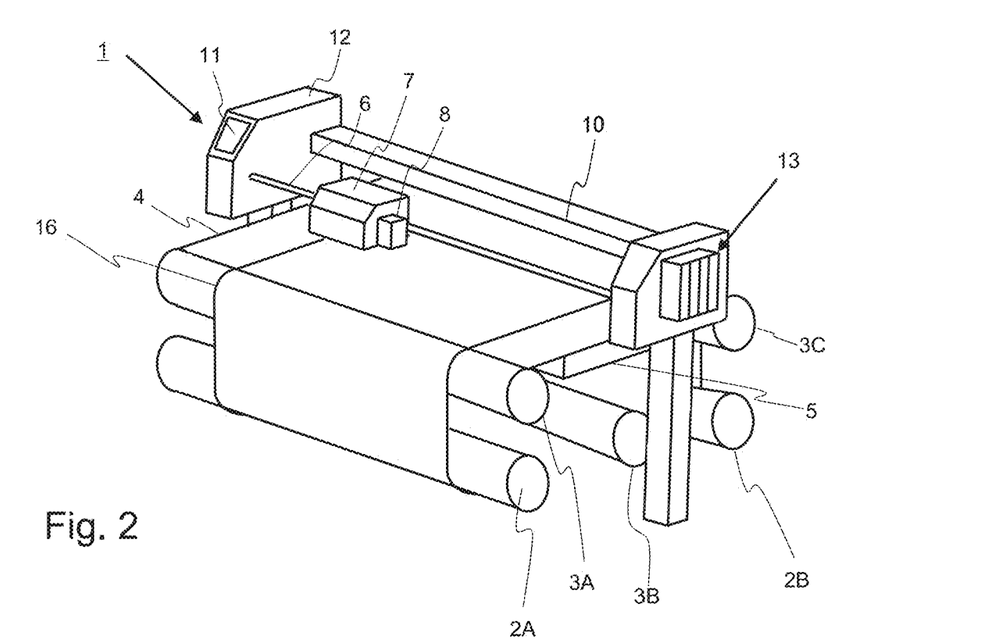
FIG. 2 is a schematic perspective view of a second example of a printing system according to the present invention in a second printing mode.

The printer 1 in FIG. 1 is a so-called hybrid printer, capable of handling both flexible media and rigid substrates. In FIG. 1, the printer 1 operates in a first print mode, wherein the printer 1 is configured for transporting rigid substrates, such as the recording medium 15. Such rigid print media 15 may be panels, for example panels for doors or walls, corrugated media, plates formed of plastic or metal, etc. To handle these rigid print media 15, the printer 1 in FIG. 1 is configured with a substantially linear transport path: from the media input device 14, the recording medium 15 moves forward along the inkjet printing assembly 7 at a at substantially constant height. The media input unit 14 and the receiving unit are positioned at the level of the medium support surface of the belt 4. In FIG. 2, a flexible web medium 16 is supplied to the printer 1, which web medium 16 may be composed of e.g. paper, label stock, coated paper, plastic or textile. The web medium 16 is supplied from the input roller 2A and extends across the belt 4 to the take-up roller 2B, where the web medium 16 is re-wound. The printer 1 is configured to swiftly and efficiently switch between print modes.

Further, the printer 1 shown in FIG. 2 comprises a page-wide curing array 10. The page-wide curing array extends in the main scanning direction. The page-wide curing array does not move in operation in the main scanning direction. The page-wide array may move in the direction of medium transport, which is a direction perpendicular to the scanning direction.

Control

Figure 3:
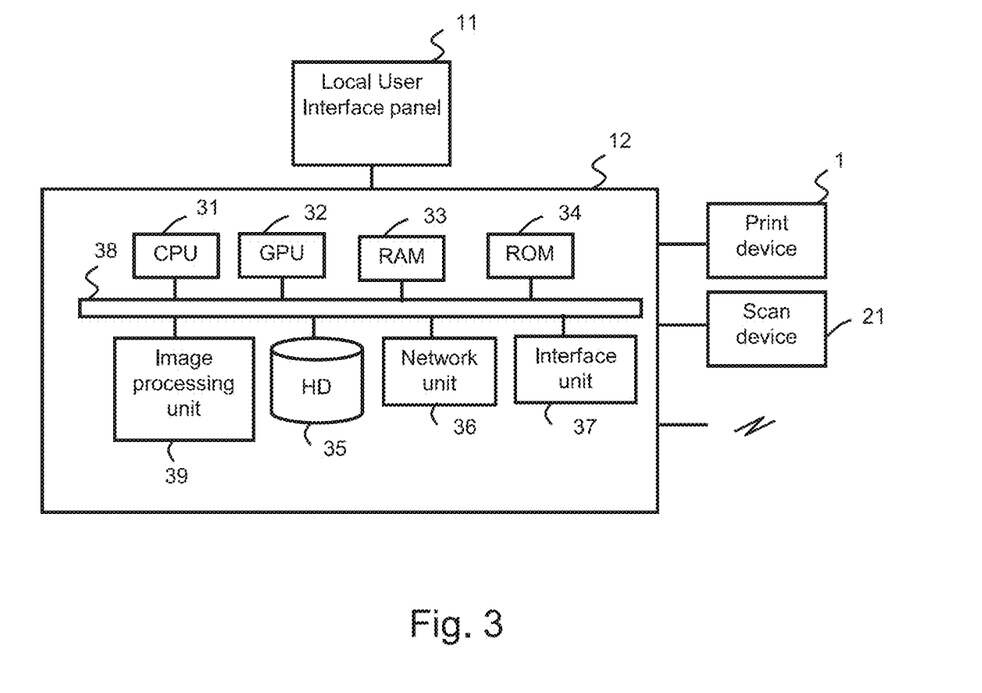
FIG. 3 is a schematic diagram of a control unit of a reprographic system according to FIG. 1 or 2.

An embodiment of the control unit 12 is in more detail presented in FIG. 3. As shown in FIG. 3, the control unit 12 comprises a Central Processing Unit (CPU) 31, a Graphical Processor Unit (GPU) 32, a Random Access Memory (RAM) 33, a Read Only Memory (ROM) 34, a network unit 36, an interface unit 37, a hard disk (HD) 35 and an image processing unit 39 such as a Raster Image Processor (RIP). The aforementioned units 31-37 are interconnected through a bus system 38. However, the control unit 12 may also be a distributed control unit.

The CPU 31 controls the printing system 1 in accordance with control programs stored in the ROM 34 or on the HD 35 and the local user interface panel 5. The CPU 31 also controls the image processing unit 39 and the GPU 32. The ROM 34 stores programs and data such as boot program, set-up program, various set-up data or the like, which are to be read out and executed by the CPU 31. The hard disk 35 is an example of a non-volatile storage unit for storing and saving programs and data which make the CPU 31 execute a print process to be described later. The hard disk 35 also comprises an area for saving the data of externally submitted print jobs. The programs and data on the HD 35 are read out onto the RAM 33 by the CPU 31 as needed. The RAM 33 has an area for temporarily storing the programs and data read out from the ROM 34 and HD 35 by the CPU 31, and a work area which is used by the CPU 31 to execute various processes. The interface unit 37 connects the control unit 12 to the client devices, such as scan device 21 and to the printing system 1. The network unit 36 connects the control unit 12 to the network N and is designed to provide communication with the workstations (not shown) and with other devices 21 reachable via the network N. The image processing unit 39 may be implemented as a software component running on an operation system of the control unit 12 or as a firmware program, for example embodied in a field-programmable gate array (FPGA) or an application-specific integrated circuit (ASIC). The image processing unit 39 has functions for reading, interpreting and rasterizing the print job data. Said print job data contains image data to be printed (i.e. fonts and graphics that describe the content of the document to be printed, described in a Page Description Language or the like), image processing attributes and print settings.

Figure 4A:
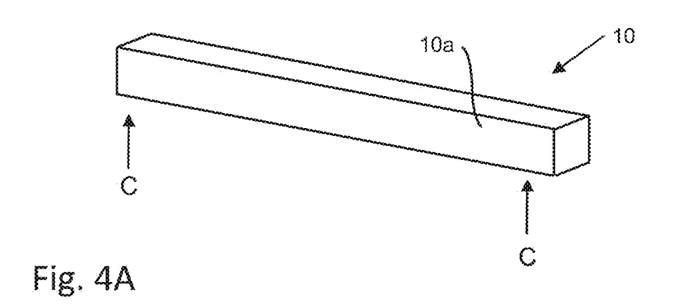
FIG. 4A is a perspective view of a page-wide curing array according to a first example.

FIG. 4A is a perspective view of a page-wide curing array according to a first example. The page-wide curing array 10 comprises a housing 10A for covering the radiation-emitting elements present in the page-wide curing array.

Figure 4B:
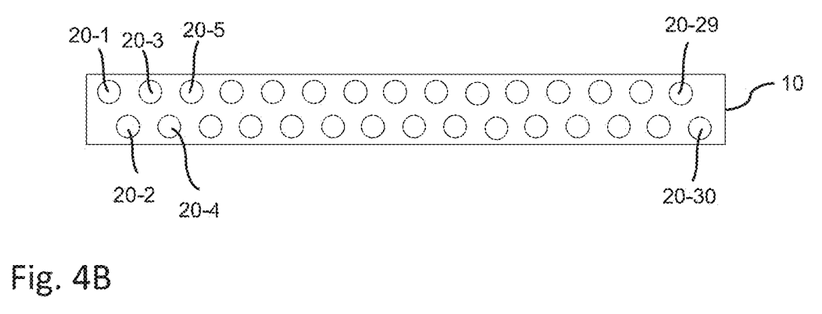
FIG. 4B is a bottom view of a page-wide curing array according to a first example.

FIG. 4B is a bottom view of a page-wide curing array according to a first example. The page-wide curing array comprises a number of LED-s 20-1, 20-1, 203, . . . 20-30. In the example shown in FIG. 4B, the curing array comprises 30 LEDs. However, the curing array may comprise an alternative number of LEDs, and may comprises tens of LEDS, hundreds of LEDs or even thousands of LEDs. In the example shown in FIG. 3B, the LEDS are arranged in two rows. The first row comprises LEDS 20-1, 20-3, 20-5, . . . , 20-29., whereas the second rows comprises LEDs 20-2, 20-4, . . . , 20-30. The LEDs in the example shown are positioned in a staggered fashion, but in an alternative example, a different configuration may be used. The LEDs may be individually controllable.

Figure 4C:
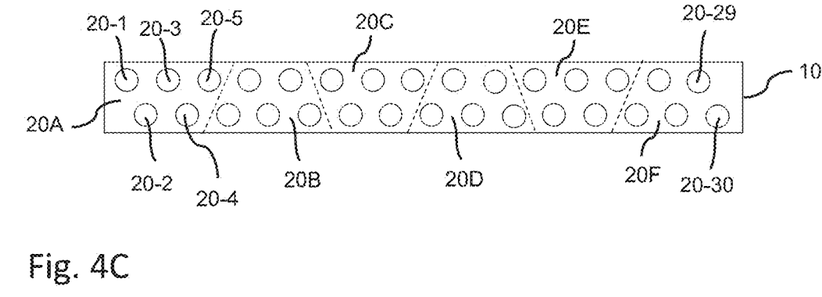
FIG. 4C is a bottom view of a page-wide curing array according to a second example.

FIG. 4C is a bottom view of a page-wide curing array according to a second example; The page-wide curing array comprises a number of LED-s 20-1, 20-1, 203, . . . 20-30, like the first example shown in FIG. 4B. In the second example, shown in FIG. 3C, the LEDs are grouped. The page-wide curing array shown in FIG. 4C comprises radiation-emitting units 20A, 20B, 20C, 20D, 20E and 20F, each comprising 5 LED elements. In an alternative example, the radiation-emitting units could comprise an alternative number of LEDs elements and optionally, the number of LEDs elements may not be the same for each unit. The units are separated by dashed lines as shown in FIG. 4C, but there is no need for a visible border on the surface of the page-wide curing array. The electronics connected to the LEDs units of the page-wide curing array and the control unit may be configured such that the LEDs within one unit are controlled as a group, but the different units 20A, 20B, 20C, 20D, 20E and 20F may be controlled individually.

Figure 5A:
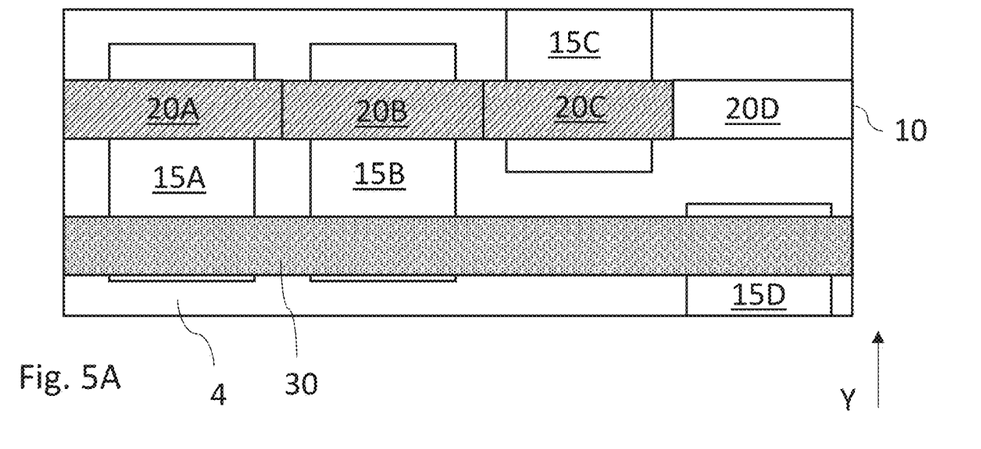
FIG. 5A shows a first example of a method according to the present invention.

FIG. 5A shows a first example of a method according to the present invention. FIG. 5A is a schematic top view of the printing apparatus comprising a page-wide curing array 10 and medium support 4. In FIG. 5A, the printing zone 30 is shown, wherein a radiation-curable composition, such as radiation-curable ink, is applied onto the recording medium to form an image. For clarity, the ink applicator is not shown in FIG. 5A. The page-wide curing array 10 comprises four radiation emitting units 20A, 20B, 20C and 20D, which are individually controllable.

In the first embodiment shown in FIG. 5A, the medium support 4 carries 4 pieces of recording media 15A, 15B, 15C, 15D. The recording media are rigid media. The recording media are in several stages of transport in the medium transport direction Y through the printing apparatus. The recording media 15A-15D are being transported towards the curing zone for curing. The curing zone is not shown in FIG. 5A, but is positioned underneath the page-wide curing array 10. Recording media 15A, 15B, 15C are (partially) positioned in the curing zone (not shown), whereas recording medium 15D is not positioned in the curing zone. Radiation-emitting elements 20A, 20B, 20C are in an operating mode and are emitting radiation. Radiation-emitting element 20D is in a non-operating mode and is not emitting radiation.

Figure 5B:
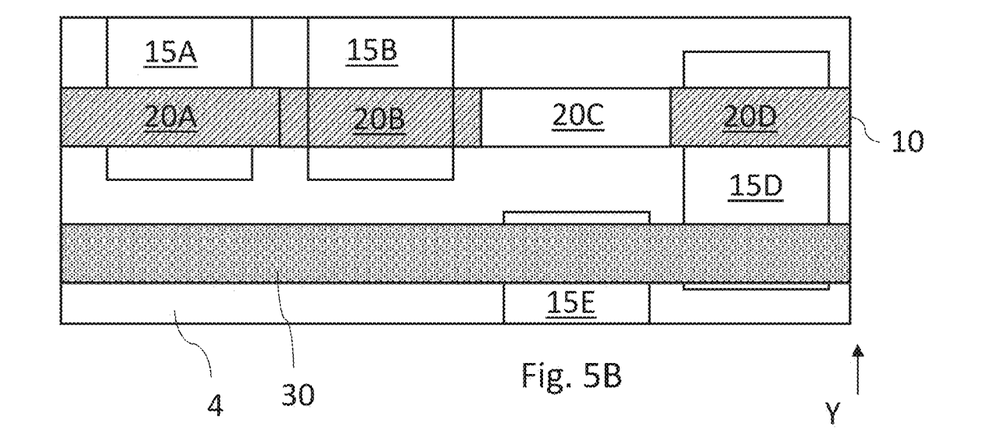
FIG. 5B shows a second example of a method according to the present invention.

FIG. 5B shows a second example of a method according to the present invention. In the second example, the recording media have moved further in the medium transport direction Y. Further, an additional recording medium 15E is present on the medium support 4, whereas recording medium 15C is no longer present on the medium support 4. Recording media 15A, 15B, 15D are (partially) positioned in the curing zone (not shown), whereas recording medium 15E is not positioned in the curing zone. Radiation-emitting elements 20A, 20B, 20D are in an operating mode and are emitting radiation. Radiation-emitting element 20C is in a non-operating mode and is not emitting radiation.

Figure 5C:
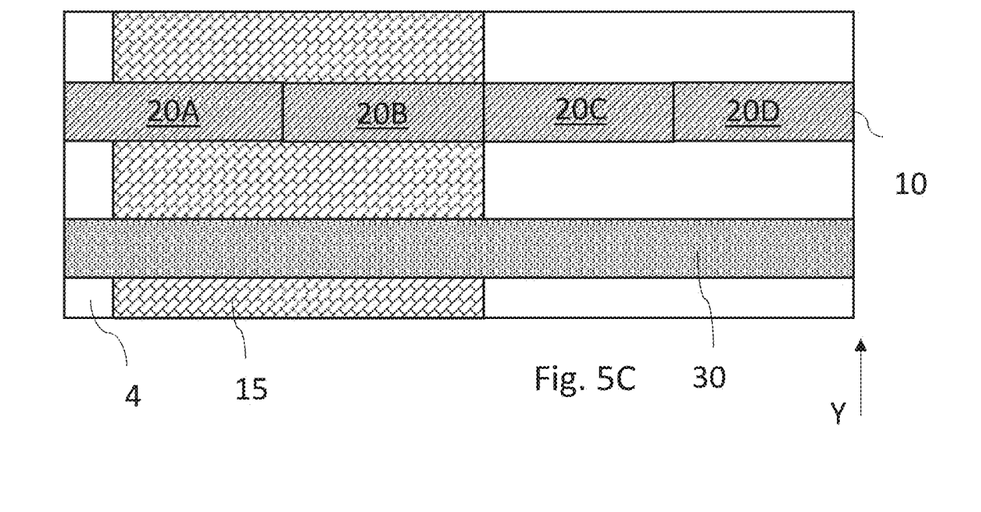
FIG. 5C shows a third example of a method according to the present invention.

FIG. 5C shows a third example of a method according to the present invention. FIG. 5C, like FIGS. 5A and 5B, is a schematic top view of the printing apparatus comprising a page-wide curing array 10 and medium support 4. In FIG. 5A, the printing zone 30 is shown, wherein a radiation-curable composition, such as radiation-curable ink, is applied onto the recording medium to form an image. For clarity, the ink applicator is not shown in FIG. 5C.

The page-wide curing array 10 comprises four radiation emitting units 20A, 20B, 20C and 20D, which are individually controllable.

In the third embodiment shown in FIG. 5C, the medium support 4 carries recording medium 15. The width of the recording medium 15 in the direction perpendicular to the medium transport direction is smaller than the width of the medium support 4 in the direction perpendicular to the medium transport direction. The recording media 15 is being transported towards the curing zone for curing. The curing zone is not shown in FIG. 5C, but is positioned underneath the page-wide curing array 10. Recording medium 15 is a flexible medium having a high thermal conductivity. All radiation-emitting elements 20A, -20D are in an operating mode and are emitting radiation.

Figure 6:
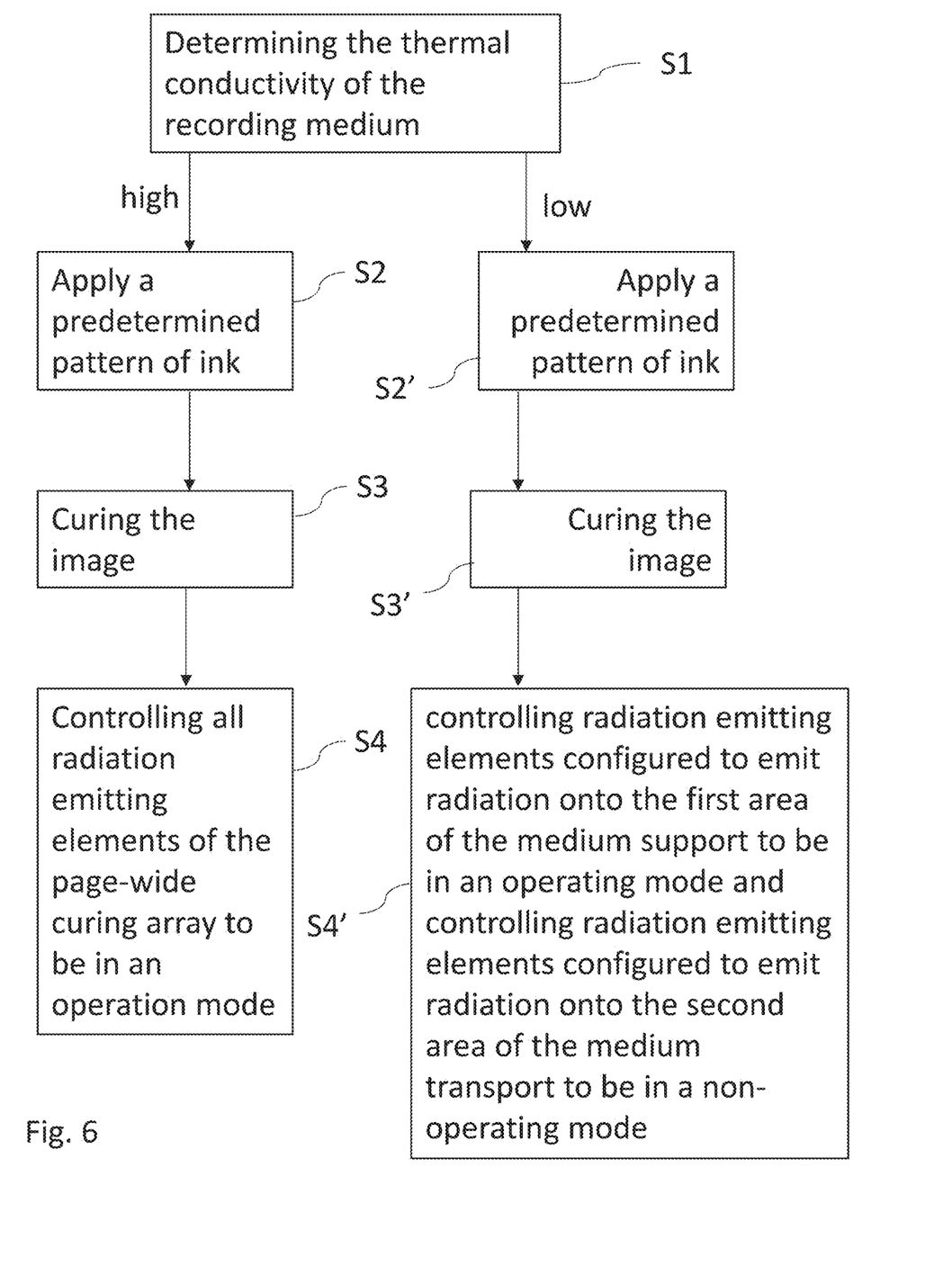
FIG. 6 is a flow diagram showing a first aspect of the invention.

FIG. 6 is a flow diagram showing a first aspect of the invention.

In S1, the thermal conductivity of the recording medium is determined. The thermal conductivity may be high or may be low. If the thermal conductivity of the recording medium is determined to be high, then in step S2, a predetermined pattern of ink is applied onto the recording medium to form an image. In step S3, the image is cured. The image may be cured using a page-wide array, said page-wide array comprising a number of individually controllable radiation emitting units. In step S4, all radiation emitting elements of the page-wide curing array are controlled to be in an operation mode. Hence, the page-wide curing array may emit radiation over the entire range of radiation-emitting elements. The radiation may be emitted onto the recording medium provided with the radiation-curable ink. Depending on the dimensions of the recording medium, the radiation emitted by the radiation-emitting elements may also irradiate the medium support.

If the thermal conductivity of the recording medium is determined to be low, then in step S2, a predetermined pattern of ink is applied onto the recording medium to form an image. In step S3, the image is cured. The image may be cured using a page-wide array, said page-wide array comprising a number of individually controllable radiation emitting units. In step S4, the radiation emitting elements configured to emit radiation onto the first area of the medium support are controlled to be in an operating mode and controlling radiation emitting elements configured to emit radiation onto the second area of the medium transport are controlled to be in a non-operating mode. Hence, the page-wide curing array may not emit radiation over the entire range of radiation-emitting elements, but only to the first area of the medium support, which is the area of the medium support covered by the recording medium. The second area of the medium support, which is the area of the medium support not covered by the recording medium, may not receive irradiation.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually and appropriately detailed structure. In particular, features presented and described in separate dependent claims may be applied in combination and any combination of such claims are herewith disclosed. Further, the terms and phrases used herein are not intended to be limiting; but rather, to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention claimed is:

1. A method for printing and curing an image using a printer having a curing unit, the curing unit comprising at least one controllable radiation emitting unit, the printer further comprising a medium support configured to in operation support the recording medium, the method comprising the steps of:
   a) determining the thermal conductivity of the recording medium;
   b) applying a predetermined pattern of a radiation-curable ink composition onto a recording medium to form an image;
   c) curing the image in a curing zone, wherein in the curing zone the recording medium covers a first area of the medium support, the medium support further having a second area not covered by the recording medium; and
   d) controlling the radiation-emitting elements to emit radiation, wherein step d further comprises:
      i. if the thermal conductivity of the recording medium is high, controlling the curing unit to be in a curing mode; and
      ii. if the thermal conductivity of the recording medium is low, then controlling the curing unit to be in a curing mode in the first area of the medium support and controlling the curing unit to be in a non-curing mode in the second area of the medium support.

2. The method according to claim 1, wherein the curing unit is a page-wide curing array, the page-wide curing array comprising a number of individually controllable radiation emitting units being arranged along a direction perpendicular to a direction of medium transport, wherein in step d-ii, the radiation emitting units, configured to in operation emit radiation onto the first area of the medium support, are controlled to be in a curing mode and wherein the radiation emitting units, configured to in operation emit radiation onto the second area of the medium support, are controlled to be in a non-curing mode.

3. The method according to claim 1, wherein the curing unit is a scanning curing unit configured to in operation move in reciprocation in a scanning direction in an area covering both the first area of the recording medium and the second area of the recording medium.

4. The method according to claim 1, wherein the method further comprises:
   b') moving the recording medium relative to the curing unit in the direction of medium transport to the curing zone.

5. The method according to claim 1, wherein the individually controllable radiation emitting units are LED units comprising at least one LED element.

6. A printing apparatus comprising:
   a. a curing unit, the curing unit comprising a at least one controllable radiation emitting unit;
   b a medium support to, in operation, support the recording medium;
   c. a radiation-curable ink applicator; and
   d. a controller configured to control the ink-jet printer to perform the method according claim 1.

7. The printing apparatus according to claim 6, wherein the printing apparatus is a hybrid printing apparatus.

8. The printing apparatus according to claim 6, wherein the radiation-curable ink applicator is positioned upstream, in the direction of medium transport, with respect to the curing unit, and wherein the distance between the radiation-curable ink applicator and the curing unit is such that the time interval between applying radiation-curable ink and curing the ink is at least 3 s.

9. The printing apparatus according to claim 8, wherein the radiation-curable ink is a radiation-curable gelling ink.

10. A software product comprising program code on a non-transitory machine-readable medium, wherein the program code, when loaded into a controller of a printer with an applicator for applying a radiation-curable ink, a transport belt and a curing unit, causes the controller to perform the method according to claim 1.

* * * * *